United States Patent
Nishiwaki

(10) Patent No.: US 6,278,922 B1
(45) Date of Patent: Aug. 21, 2001

(54) DEVICE FOR CONTROLLING THE STEERING ANGLE OF A VEHICLE

(75) Inventor: Takeshi Nishiwaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/408,179

(22) Filed: Sep. 29, 1999

(30) Foreign Application Priority Data

Apr. 7, 1999 (JP) .................................................. 11-100532

(51) Int. Cl.[7] .............................. B62D 1/00; B62D 5/00; B62D 6/00; G06F 17/00; G06F 19/00
(52) U.S. Cl. ........................... 701/41; 180/197; 180/233; 180/404; 180/442; 180/443; 180/446; 280/735; 318/52; 318/432; 318/489; 318/587
(58) Field of Search .................................... 701/41, 42, 1; 180/197, 233, 404, 442, 443, 446; 280/735; 318/52, 432, 489, 587; 74/866; 364/424.05, 424.02, 565

(56) References Cited

U.S. PATENT DOCUMENTS

| | | | |
|---|---|---|---|
| 4,946,001 | * | 8/1990 | Taniguchi et al. .................. 180/79.1 |
| 5,184,527 | * | 2/1993 | Nakamura ................................ 74/866 |
| 5,253,172 | * | 10/1993 | Ito et al. ........................... 364/424.05 |
| 5,398,953 | * | 3/1995 | Shimizu .............................. 180/79.1 |
| 5,448,482 | * | 9/1995 | Yamamoto et al. ............. 364/424.05 |
| 5,481,457 | * | 1/1996 | Yamamoto et al. ............. 364/424.05 |
| 5,729,107 | * | 3/1998 | Shimizu et al. ...................... 318/489 |
| 5,828,972 | * | 10/1998 | Asanuma et al. ...................... 701/41 |
| 5,996,724 | * | 12/1999 | Shimizu et al. ...................... 180/446 |
| 6,018,691 | * | 1/2000 | Yamamoto et al. .................... 701/41 |
| 6,091,214 | * | 7/2000 | Ymawaki et al. ..................... 318/52 |
| 6,102,151 | * | 8/2000 | Shimizu et al. ...................... 180/446 |

FOREIGN PATENT DOCUMENTS

| | | |
|---|---|---|
| 61-13106 | 1/1986 | (JP) . |
| 4-71960 | * 3/1992 | (JP) . |
| 9-258822 | 10/1997 | (JP) . |

* cited by examiner

Primary Examiner—William A. Cuchlinski, Jr.
Assistant Examiner—Ronnie Mancho
(74) Attorney, Agent, or Firm—Sughrue, Mion, Zinn, Macpeak & Seas, PLLC

(57) ABSTRACT

A device for controlling the steering angle of a vehicle over a wide range maintaining improved control precision. The device controls the steering angle $\theta d$ through a steering drive device 10 so as to come in agreement with a target angle $\theta 0$. A steering angle detection device includes a first potentiometer 11 that produces a first angle detection value $\theta 1$ and a second potentiometer 12 that produces a second angle detection value $\theta 2$. A target torque operation means 20 includes an angle operation unit 22 for operating the steering angle based on the first and second angle detection values, and the angle operation unit 22 produces the first angle detection value as the steering angle outside the second angular range, and produces the second angle detection value as the steering angle inside the second angular range.

12 Claims, 9 Drawing Sheets

DEVICE FOR CONTROLLING THE STEERING ANGLE OF A VEHICLE

BACKGROUND OF THE INVENTION

1. Field of the Invention

The present invention relates to a device for controlling the steering angle of a vehicle, which automatically controls the rotational angle (steering angle) of a steering shaft to assume a target value. More particularly, the invention relates to a device for controlling the steering angle of a vehicle, which features improved control precision over a wide range of steering angles.

2. Prior Art

There has heretofore been known a device for automatically controlling the steering angle of a radio-controlled vehicle for use exclusively in yard (hereinafter referred to as "radio-controlled vehicle") to assume a target angle in an attempt to improve productivity and operation efficiency by saving manpower as taught in, for example, Papers of Academic Lectures, 944, Japanese Technological Association of Automobiles, Oct., 1991.

To control the steering angle of the radio-controlled vehicle of this kind, the rotational angle of the steering shaft must be detected as an absolute value. At present, a voltage detected by a potentiometer is converted into a digital value through an A/D converter and is used as a detected angular value (hereafter an angle detection value).

Similar automatic control devices have also been taught, such as a radio-controlled device for vehicles disclosed in Japanese Unexamined Patent Publication (Kokai) No. 258822/1997 and a steering angle detecting device for vehicles disclosed in Japanese Unexamined Patent Publication (Kokai) No. 13106/1986.

However, the conventional devices disclosed in the above-mentioned publications are still not satisfactory with respect to precision for controlling the steering angle and the control response. When applied to an automatic operation controller used on an automobile road such as an expressway, for example, control performance is not obtained to a satisfactory degree and it becomes difficult to maintain travelling within a lane.

In order to improve the steering angle control precision and the control response, furthermore, the precision for detecting the steering angle must be heightened. When it is attempted to heighten the resolution of the A/D converter by using a potentiometer, however, the device tends to become susceptible to noise making, after all, and it is difficult to improve the detection precision to a sufficient degree.

Because of lack of steering angle control precision and control response, therefore, the conventional devices for controlling steering angle of the vehicle could not be applied to automatically operating the vehicles on an automobile road.

Besides, when it is attempted to enhance the detection precision of the potentiometer by enhancing the resolution of the A/D converter from the standpoint of improving steering angle control precision and response performance, the device tends to become susceptible to noise making, and it is difficult to improve the steering angle detection precision to a sufficient degree.

SUMMARY OF THE INVENTION

The present invention was accomplished in order to solve the above-mentioned problems, and its object is to provide a device for controlling the steering angle of a vehicle, which features improved control precision over a wide range, by using angle detection values of a first potentiometer in a first angular range corresponding to the whole steering angles and by using angle detection values of a second potentiometer having a high resolution in a narrow second angular range near the neutral point of the steering angles.

A device for controlling the steering angle of a vehicle according to the present invention comprises:

a steering drive means for rotatably driving a steering shaft;

a steering angle detection means for producing the rotational angle of said steering shaft as an angle detection value; and a target torque operation means for operating a target torque to be applied to said steering shaft based on a deviation between a target angle of said steering shaft and a steering angle based on said angle detection value, wherein said target torque is applied to said steering shaft through said steering drive means so that said steering angle is brought into agreement with said target angle;

wherein said steering angle detection means includes:

a first potentiometer that produces a second detected angular value (hereafter a first angle detection value) proportional to a-rotational position over a first angular range in which said steering shaft can be turned; and a second potentiometer that produces a second detected angular value (hereafter a second angle detection value) proportional to a rotational position over a second angular range which includes a neutral point of said steering shaft and is narrower than said first angular range; and wherein said target torque operation means includes an angle operation unit for operating said steering angle based on said first and second angle detection values; and wherein said angle operation unit produces said first angle detection value as said steering angle when said first angle detection value lies outside said second angular range, and produces said second angle detection value as said steering angle when said first angle detection value lies within said second angular range.

The angle operation unit includes a weighing/synthesizing means for weighing and synthesizing said first and second angle detection values and wherein, the output value of said weighing/synthesizing means is produced as said steering angle in a range close to an angular position where said first and second angle detection values are changed over, said weighing/synthesizing means uses a first weighing coefficient and a second weighing coefficient which gradually change in a complementary manner in said close range, and produces values obtained by multiplying said first and second angle detection values by said first and second weighing coefficients, said first weighing coefficient being set to 1 outside said second angular range and being set to 0 within said second angular range, and said second weighing coefficient being set to 0 outside said second angular range and being set to 1 within said second angular range.

The angle operation unit includes an offset error operation means for operating an offset error between said first potentiometer and said second potentiometer based on a deviation between said first angle detection value and said second angle detection value, and a correction means for correcting at least either said first angle detection value or said second angle detection value by using said offset error.

The offset error operation means includes a histogram operation means for operating a histogram of a deviation in the detection value, and produces, as an offset error, a deviation in the detection value that appears most frequently in said histogram.

The offset error operation means includes a filtering means, and uses a first filtering coefficient and a second filtering coefficient that are set in a complementary manner, and produces, as said offset error, the values obtained by multiplying the deviation in the detection value of this time and the deviation in the detection value of the previous time by said first filtering coefficient and said second filtering coefficient, respectively.

The offset error operation means produces the offset error of the previous time when a difference between the deviation in the detection value of this time and the deviation in the detection value of the previous time is larger than a permissible value.

The offset error operation means produces said offset error based on said deviation in the detection value when said first angle detection value lies within said second angular range, and produces said deviation in the detection value of the previous time as said offset error when said first angle detection value lies outside said second angular range.

The second potentiometer produces the second angle detection value in a manner to repeat the same value for every turn of said second potentiometer.

A device for controlling the steering angle of a vehicle according to the present invention comprises a steering angular velocity operation means for operating the rotational angular velocity of said steering shaft as a steering angular velocity based on said first and second angle detection values, and wherein said target torque operation means operates said target torque based upon a deviation between the target angular velocity of said steering shaft and said steering angular velocity.

The steering angular velocity operation means operates said steering angular velocity based on said first angle detection value when said first angle detection value lies outside said second angular range, and operates said steering angular velocity based on said second angle detection value when said first angle detection value lies within said second angular range.

The steering angular velocity operation means includes a first steering angular velocity operation unit and a second steering angular velocity operation unit for operating a first steering angular velocity and a second steering angular velocity, respectively, from said first and second angle detection values, and a weighing/synthesizing means for weighing and synthesizing said first and second steering angular velocities, and wherein an output value of said weighing/synthesizing means is operated as said steering angular velocity in a range close to an angular position where said first and second angle detection values are changed over.

The second potentiometer produces said second angle detection value in a manner to repeat the same value for every turn of the said second potentiometer, and wherein said steering angular velocity operation means operates said steering angular velocity based on said second angle detection value in an angular range in which said second angle detection value linearly changes, and operates said steering angular velocity based on said first angle detection value in a range close to an angle where said second angle detection value sharply changes.

The first potentiometer 11 produces a first detected angular value (hereafter a first angle detection value) θ1 proportional to the rotational position over a first angular range D1 (e.g., ±900 degrees) in which the steering shaft 2 can be turned.

The second potentiometer 12 produces a second detected angular value (hereafter a second angle detection value) θ2 proportional to the rotational position over a second angular range D2 (e.g., ±180 degrees) that includes a neutral point (0 degree) of the steering shaft 2 and is narrower than the first angular range D1.

DESCRIPTION OF THE PREFERRED EMBODIMENTS

Embodiment 1

An embodiment 1 of the present invention will now be described with reference to the drawings.

Figure 1:
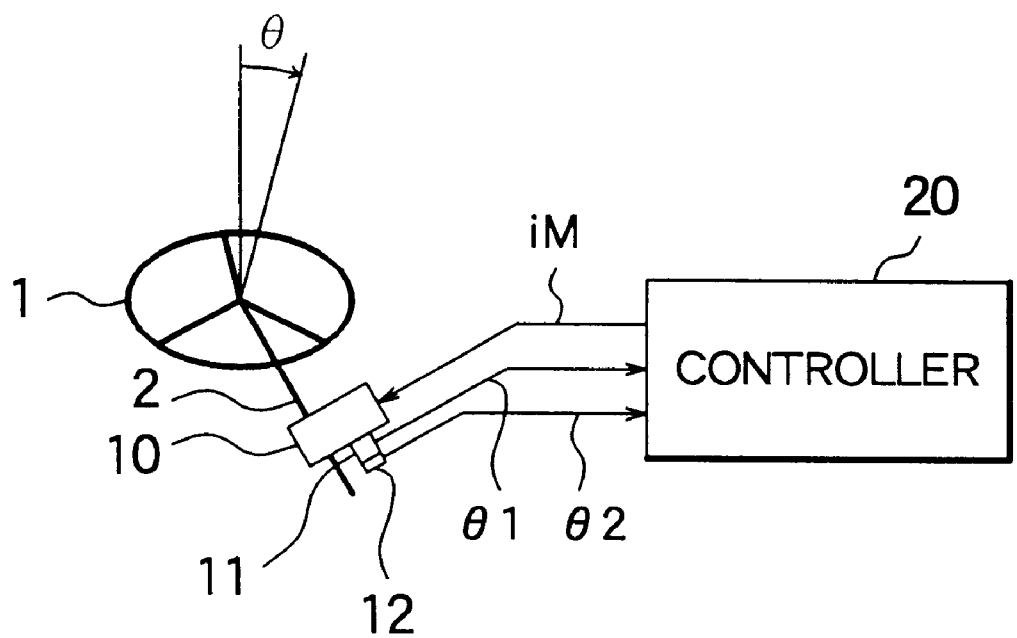
FIG. 1 is a block diagram illustrating the constitution of an embodiment 1 according to the present invention.
Figure 2:
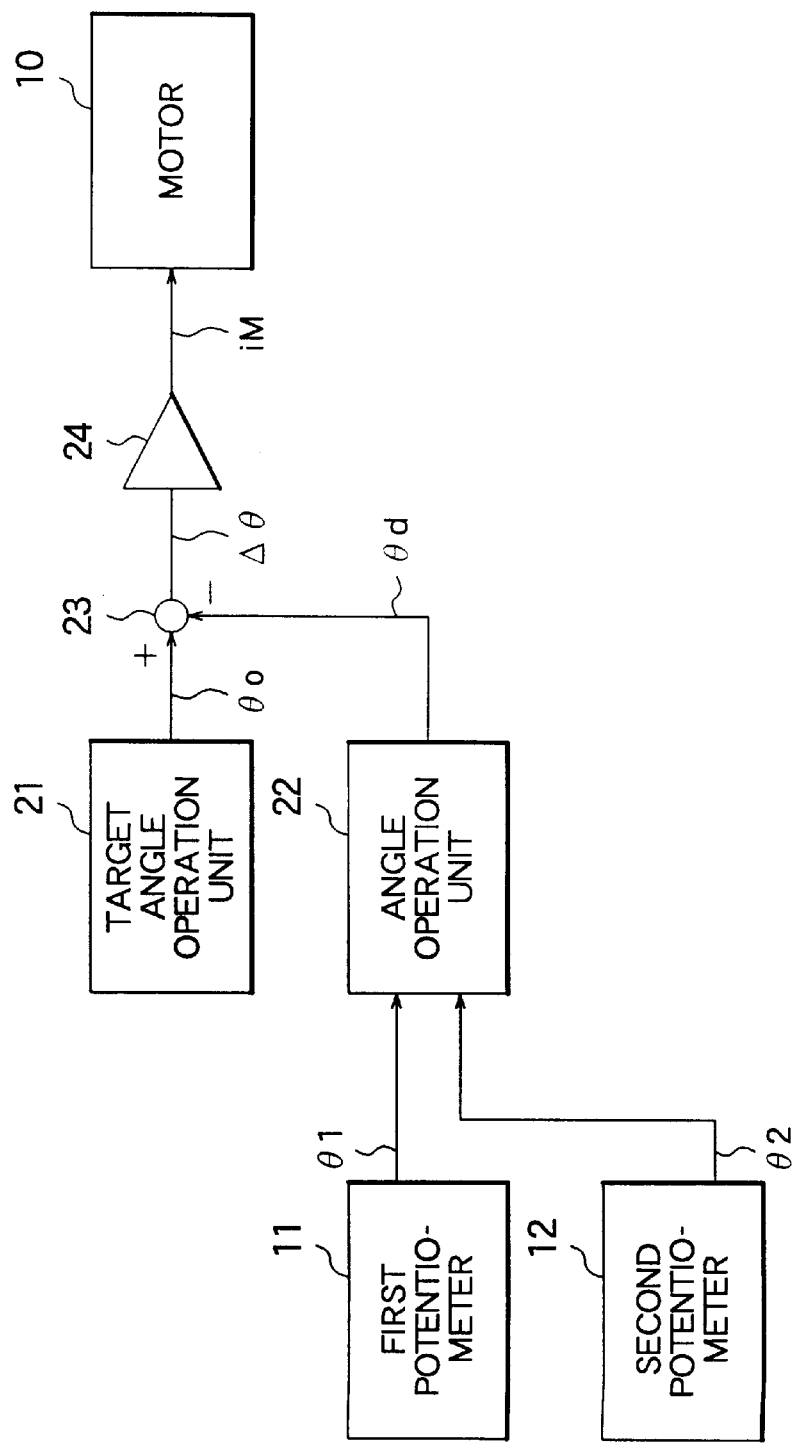
FIG. 2 is a functional block diagram concretely illustrating the constitution of a controller 20 in FIG. 1.
Figure 3:
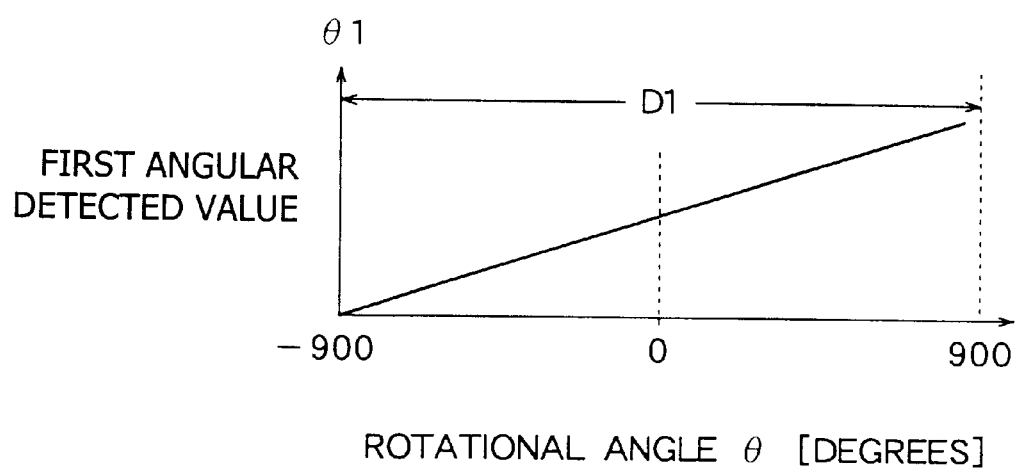
FIG. 3 is a diagram illustrating the output characteristics of a first potentiometer in FIG. 1.
Figure 4:
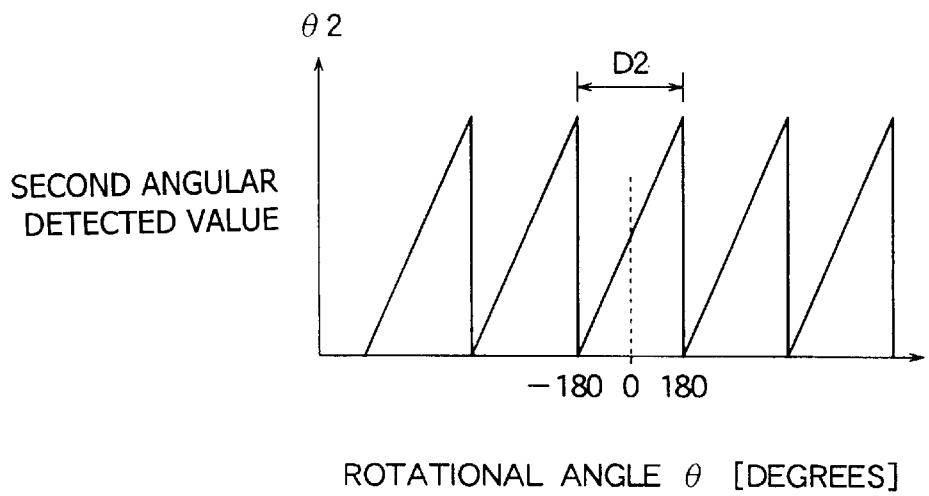
FIG. 4 is a diagram illustrating the output characteristics of a second potentiometer in FIG. 2.

FIG. 1 is a block diagram schematically illustrating the constitution of an embodiment 1 according to the present invention, FIG. 2 is a functional block diagram concretely illustrating the constitution of a controller 20 in FIG. 1, and FIGS. 3 and 4 are diagrams illustrating the output characteristics of a first potentiometer 11 and a second potentiometer 12 (steering angle detection means) in FIG. 1.

In FIG. 1, a steering shaft 2 of a steering wheel 1 manipulated by a driver is provided with a motor 10 which is a steering drive means for rotatably driving the steering shaft 2. The motor 10 is also used as a drive means for power steering.

The motor 10 is provided with a first potentiometer 11 and a second potentiometer 12 as a steering angle detection means for detecting the rotational angle θ (steering angle) of the steering shaft 2.

The first potentiometer 11 produces a first angle detection value θ 1 proportional to the rotational position over a first angular range D1 (e.g., ±900 degrees) in which the steering shaft 2 can be turned.

The second potentiometer 12 produces a second angle detection value θ 2 proportional to the rotational position over a second angular range D2 (e.g., ±180 degrees) that includes a neutral point (0 degree) of the steering shaft 2 and is narrower than the first angular range D1.

The first and second angle detection values θ 1 and θ 2 are input to a controller 20 which comprises a microcomputer.

The controller 20 operates a target torque of the motor 10 based not only upon the first and second angle detection values θ 1 and θ 2 but also upon the operation data from various other sensors (not shown), and supplies a motor current iM corresponding to the target torque to the motor 10.

In FIG. 2, the controller comprises a target angle operation unit 21, an angle operation unit 22, a subtraction means and an output buffer 24, which constitute a target torque operation means for operating a target torque (corresponds to the motor current iM) that is to be applied to the steering shaft 2.

The target angle operation unit 21 operates a target angle θ 0 of the steering shaft 2 based on various operation data.

The angle operation unit 22 produces a steering angle θ d as a final detection value based on the first and second angle detection values θ 1 and θ 2.

The subtraction means 23 operates a deviation Δ θ between the target angle θ 0 and the steering angle θ d, and the output buffer 24 amplifies the angular deviation Δ θ (by gain K1 times), and produces a motor current iM corresponding to the target torque of the steering shaft 2 to the motor 10 (steering drive means).

Then, the controller 20 applies the target torque to the steering shaft 2 through the motor 10, and automatically controls the steering wheel 1 so that the steering angle θ d is brought into agreement with the target angle θ 0.

In FIGS. 3 and 4, the abscissa represents the rotational angle θ of the steering wheel 1 (steering shaft 2), and the ordinate represents the angle detection value (sensor output voltage) θ 1, θ 2.

In FIG. 3, the first angle detection value θ 1 exhibits linear output characteristics over the first wide angular range D1 (±900 degrees) which is a whole rotational range of the steering shaft 2.

In FIG. 4, the second angle detection value θ 2 exhibits linear output characteristics over a second angular range D2 (±180 degrees) near the neutral point of the steering shaft 2.

Here, the second potentiometer 12 is constituted by a cheap sensor, and repetitively produces the second angle detection value θ 2 of the same value for every turn (360 degrees).

As will be obvious from FIGS. 3 and 4, the first angle detection value θ 1 covers the whole range of revolution of the steering shaft 2. Near the neutral point of the steering shaft 2, however, the second angle detection value θ 2 changes more steeply than the first angle detection value θ 1, and provides higher resolution.

Next, the operation of the embodiment 1 of the invention shown in FIGS. 1 and 2 will be described with reference to FIGS. 3 and 4.

In automatically driving a vehicle by controlling the steering angle, the steering shaft 2 is controlled to stay near the neutral point in a state where the vehicle is travelling straight at a high speed and, hence, the steering angle θ d of a high resolution is required.

When the steering wheel 1 is sharply steered while the vehicle is travelling at a low speed, on the other hand, the steering shaft 2 is turned to greatly deviate from the neutral point, and the steering angle θ d of a high resolution is not required.

In general, the operation range of rotational angle θ of the steering wheel 1 is about two turns (±720 degrees) in both the right and left directions, and the steering angle detection means must cover a relatively broad angular range.

As the steering angle detection means, therefore, there are employed a first potentiometer 11 and a second potentiometer 12 having different output characteristics.

The first potentiometer 11 produces, to the controller 20, the first angle detection value θ 1 maintaining output characteristics (see FIG. 3) that cover the first angular range D1 (±900 degrees) corresponding to the whole rotational range of the steering wheel 1.

The second potentiometer 12 produces, to the controller 20, the second angle detection value θ 2 maintaining linear output characteristics of high resolution (see FIG. 4) over the angular range D1 (±180 degrees) that includes the neutral point of the steering wheel 1 but is limited to a narrow range.

The angle operation unit 22 in the controller 20 produces the first angle detection value θ 1 as a steering angle θ d when the rotational angle θ of the steering wheel 1 is so great that the first angle detection value θ 1 is deviated from the second angular range D2 (±180 degrees).

When the rotational angle θ of the steering wheel 1 is so small that the first angle detection value θ 1 lies within the second angular range D2 (±180 degrees), on the other hand, it is so regarded that the vehicle is travelling straight at a high speed. In this case, a high resolution is required. Therefore, the second angle detection value θ 2 is produced as a steering angle θ d.

The controller 20 supplies the motor current iM to the motor 10 through the subtraction means 23 and the output buffer 24 to control the steering angle θ d by feedback so as to come into agreement with the target angle θ 0.

As described above, the potentiometer for detecting the rotational angle θ of the steering wheel 1 is switched over depending upon the first angle detection value θ 1 to cover the whole rotational region of the steering wheel 1, in order to accomplish both a wide range of detection and resolution, maintaining good precision near the neutral point and covering the angular range of the whole rotational region.

Generally, furthermore, the potentiometer of a high resolution is expensive and drives up the cost. However, the second potentiometer 12 is constituted by a general-purpose product having output characteristics (see FIG. 4) that repetitively produce the same detection value for every turn. Therefore, the device is cheaply constituted.

Embodiment 2

In the above-mentioned embodiment 1, no consideration was given to discrete portions that occur when the first and second angle detection values θ 1, θ 2 are changed over at the boundary positions of the second angular ranges D2. It is, however, likely that the detection values θ 1 and θ 2 of the potentiometers are offset due to error at the time of attaching the sensors.

The steering angle θ d sharply changes at the time when the angle detection values θ 1 and θ 2 are changed over and, hence, the feedback control does not work well; i.e., the rotational angle θ of the steering wheel 1 to be controlled may sharply change to vibrate, triggering unstable state.

In switching over the sensors, therefore, the switch-over portions of the first and second angle detection values θ 1 and θ 2 should be smoothly changed.

Described below with reference to the drawings is an embodiment 2 of the present invention in which the switch-over portions of the angle detection values θ 1 and θ 2 are smoothed.

Figure 5:
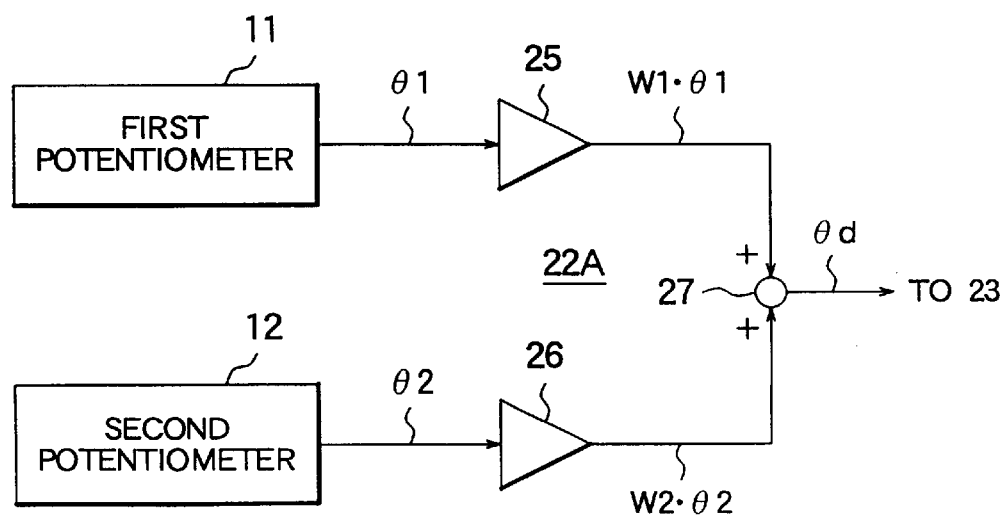
FIG. 5 is a functional block diagram illustrating an angle operation unit according to an embodiment 2 of the present invention.
Figure 6:
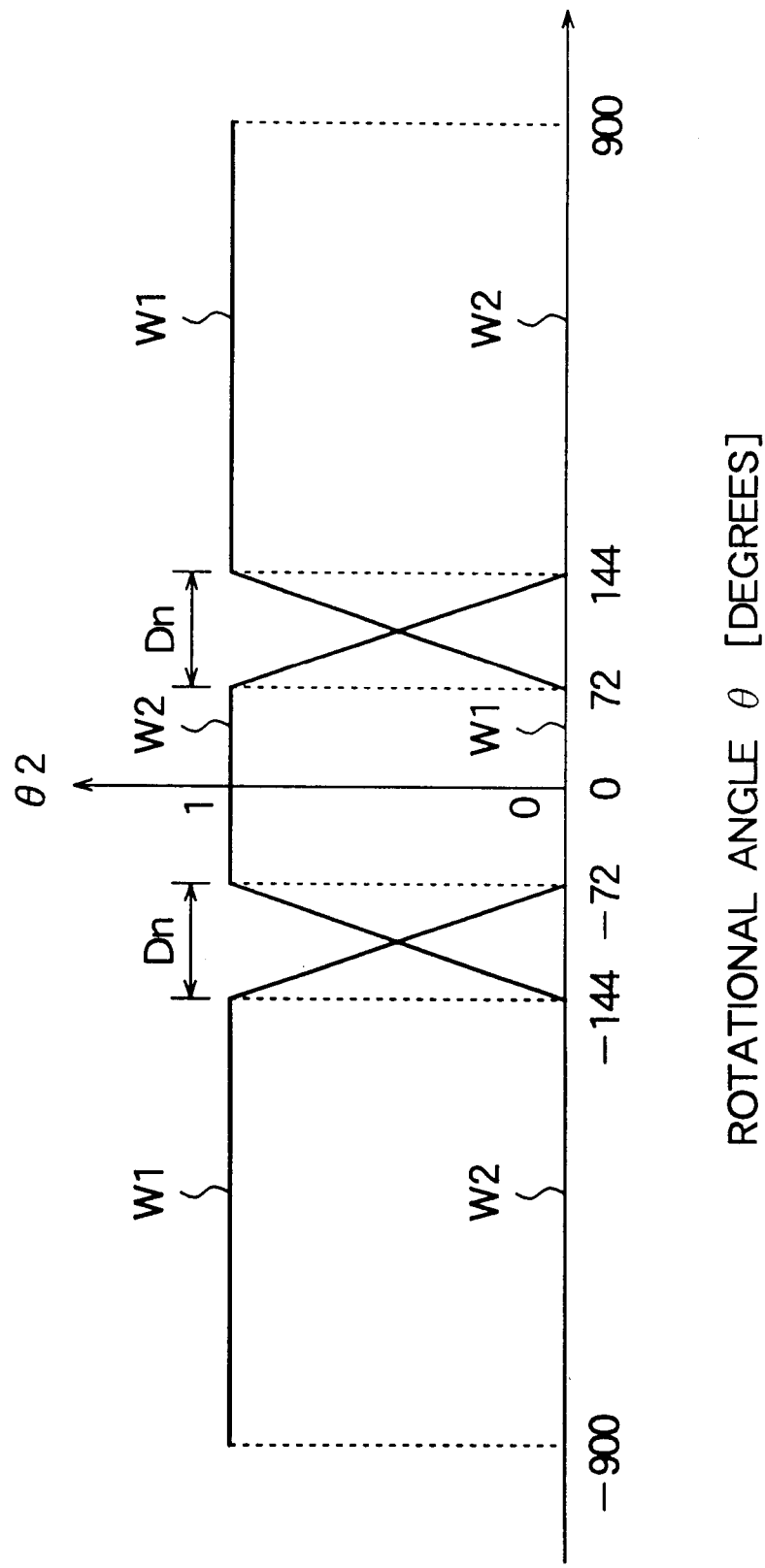
FIG. 6 is a diagram showing changes in the first weighing coefficient and in the second weighing coefficient used by a weighing/synthesizing means in the angle operation unit of FIG. 5.

FIG. 5 is a functional block diagram illustrating an angle operation unit 22A according to an embodiment 2 of the present invention, and FIG. 6 is a diagram showing changes in the first weighing coefficient W1 and the second weighing coefficient W2 used by the weighing/synthesizing means in the angle operation unit 22A.

In FIG. 5, the angle operation unit 22A includes a multiplier means 25 for multiplying the first angle detection value θ 1 by the weighing coefficient W1, a multiplier means 26 for multiplying the second angle detection value θ 2 by the weighing coefficient W2, and an adder means 27 for adding up the values multiplied through the multiplier means 25 and 26 together to output it as a steering angle θ d.

The multiplier means 25, 26 and the adder means 27 constitute a weighing/synthesizing means for weighing and synthesizing the first and second angle detection values θ 1 and θ 2, and for producing a weighed/synthesized steering angle θ d in a range Dn close to an angular position where the angle detection values θ 1 and θ 2 are changed over.

In FIG. 6, the abscissa represents the rotational angle θ [degrees] of the steering wheel 1 and the ordinate represents the values (0 to 1) of the weighing coefficients W1, W2.

The ranges Dn close to rotational positions where the angle detection values θ 1 and θ 2 are changed over, are set to be, for example, from −144 degrees to −72 degrees with −108 degrees as a center, and from 72 degrees to 144 degrees with ±108 degrees as a center, The weighing coefficients W1 and W2 used by the multiplier means 25 and 26 are set in a complementary and gradually changing manner to change over a range of from "0" to "1" in the close ranges Dn (see FIG. 6).

That is, the first weighing coefficient W1 is set to "1" on the outside of the second angular range D2 and is set to "0" inside the second angular range D2.

The second weighing coefficient W2 is set to "0" on the outside of the second angular range D2 and is set to "1" inside the second angular range D2.

Therefore, even when the sensors that are used are changed over, the angle detection values θ 1 and θ 2 are not instantaneously changed over, and gradually change from the detection values of the one side toward the detection values of the other side as shown in FIG. 6. Therefore, the sum of the angle detection values after weighing makes it possible to greatly suppress the amount of change in the steering angle θ d.

By providing the angle operation unit 22A with the weighing/synthesizing means, as described above, the angle detection values θ 1 and θ 2 mildly change when they are changed over, and discrete portions in the detection values are smoothly corrected at switch-over positions (close ranges Dn) of the sensors.

This suppresses the effect due to an offset error between the two potentiometers 11 and 12, which becomes a cause of error in the detection of angles, and makes it possible to establish a nearly linear relationship between the practical rotational angle θ and the angle detection value (steering angle) θ d.

This further makes it possible to prevent adverse effect on controlling the steering angle that stems from a sharp change in the angle detection value.

Embodiment 3

In the above-mentioned embodiment 2, the effect of offset error was decreased by using the weighing/synthesizing means. It is, however, also allowable to positively find the offset error and operate the steering angle θ d from a value obtained by correcting the offset error.

Described below with reference to the drawings is an embodiment 3 of the present invention in which the offset error is corrected.

Figure 7:
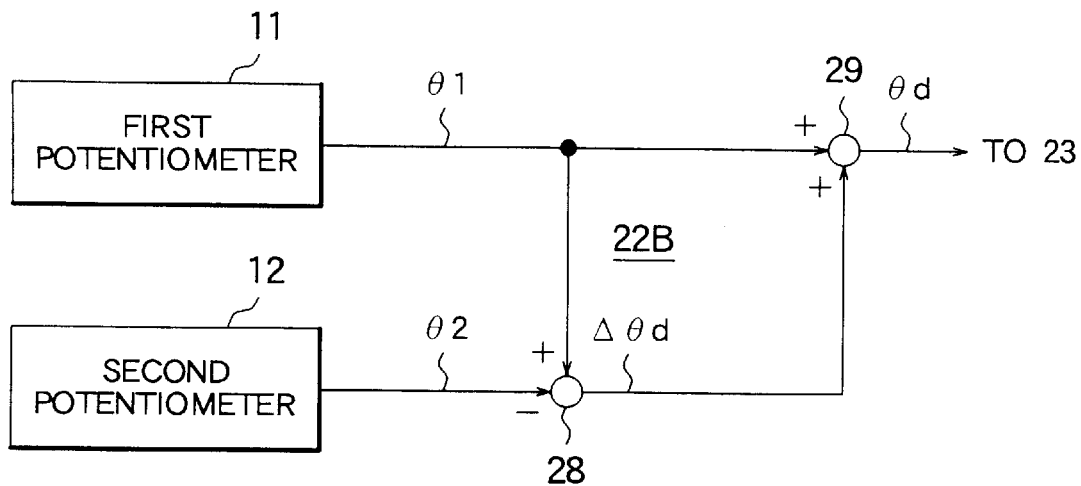
FIG. 7 is a block diagram illustrating the angle operation unit according to an embodiment 3 of the present invention.

FIG. 7 is a block diagram illustrating the angle operation unit 22B according to the embodiment 3 of the present invention. In FIG. 7, the angle operation unit 22B is provided with a subtraction means 28 and an adder means 29.

The subtraction means 28 constitutes an offset error operation means, and produces a deviation Δ θ d between the first angle detection value θ 1 and the second angle detection value θ 2 as an offset error between the first potentiometer 11 and the second potentiometer 12.

The adder means 29 constitutes a correction means for correcting the offset error by using the deviation Δ θ d in the detection value, and produces the steering angle θ d by adding the deviation Δ θ d in the detection value to the first angle detection value θ 1.

FIG. 7 illustrates the case where the first angle detection value θ 1 is corrected. The angle operation unit 22B is capable of correcting at least either the first angle detection value θ 1 or the second angle detection value θ 2.

Upon operating the steering angle θ d by correcting the offset error as described above, it is allowed to linearly correct the relationship between the practical rotational angle θ and the angle detection value (steering angle) θ d and, hence, to prevent adverse effect on the control operation caused by error compounds that stem from the attachment of the first and second potentiometers 11 and 12.

Embodiment 4

In the above-mentioned embodiment 3, the deviation Δ θ d of the detection value corresponding to the offset error is unconditionally operated. In operating the offset error, however, a histogram may be used by taking the statistic processing into consideration.

Described below with reference to the drawings is an embodiment 4 of the present invention in which the offset error is operated by using a histogram.

Figure 8:
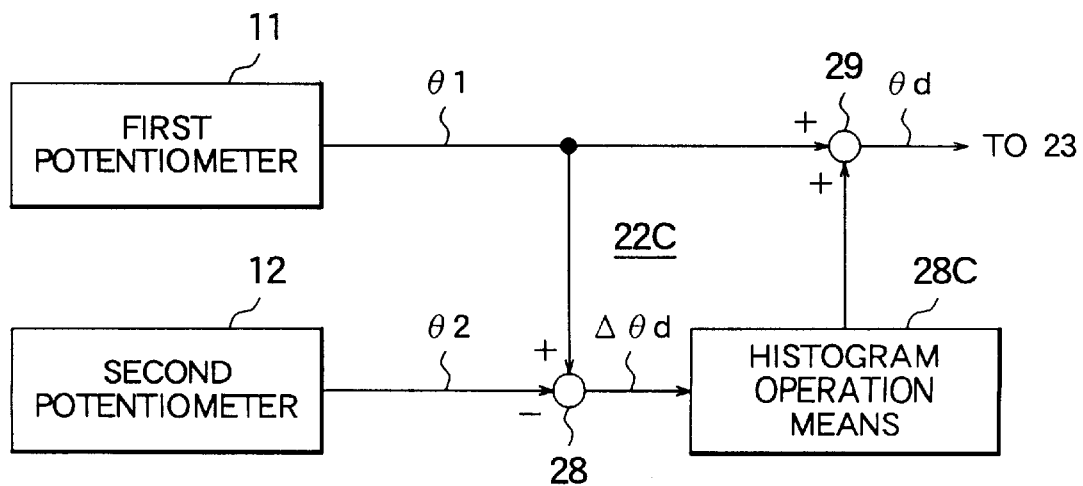
FIG. 8 is a block diagram illustrating the angle operation unit according to an embodiment 4 of the present invention.

FIG. 8 is a block diagram illustrating the angle operation unit 22C according to the embodiment 4 of the present invention, wherein an offset error operation means in the angle operation unit 22C includes a histogram operation means 28C in addition to the subtraction means 28.

The histogram operation means 28C operates the histogram of the deviation Δ θ d in the detected value and sends, as an offset error, the deviation Δ θ d in the detection value that most frequently appears in the histogram to the adder means 29.

By preparing the histogram and by using the deviation Δ θ d in the detection value that appears most frequently as an offset error (correction value), the steering angle θ d is not abnormally operated despite a single-shot noise is superposed on the angle detection values θ 1, θ 2, and the reliability in the control operation is further improved.

Embodiment 5

Though the above-mentioned embodiment 4 has used the histogram for removing the effect of noise, it is also allowable to use the filter processing.

Described below with reference to the drawings is an embodiment 5 of the present invention in which the offset error is operated based on the filter processing.

Figure 9:
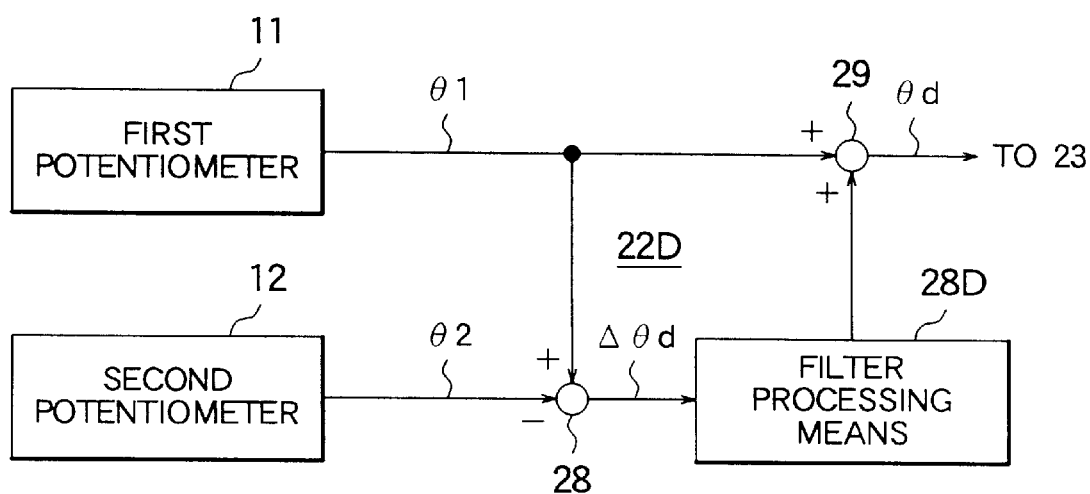
FIG. 9 is a block diagram illustrating the angle operation unit according to an embodiment 5 of the present invention.

FIG. 9 is a block diagram illustrating the angle operation unit 22D according to the embodiment 5 of the present invention, wherein an offset error operation means in the angle operation unit 22D includes a filter processing means 28D in addition to the subtraction means 28.

To operate the offset error, the filter processing means 28D executes the filtering operation with the passage of time by using the offset error value of the previous time.

That is, the filter processing means 28D uses the first and second filter coefficients that are set in a complementary manner, and sends, as an offset error, the values obtained by multiplying the deviations $\Delta \theta d$ in the detection value of this time and in the detection value of the previous time by the first and second filter coefficients, to the adder means 29.

By using the value that is filtered with the passage of time as an offset error (correction value), the steering angle $\theta$ d is not abnormally operated despite a single-shot noise is superposed on the angle detection values $\theta$ 1, $\theta$ 2, and the reliability in the control operation is improved.

Embodiment 6

In the above-mentioned embodiment 5, the filter processing means 28D has unconditionally executed the filter processing. However, a single-shot abnormal value may be inhibited from being subjected to the filter processing.

In this case, in subjecting the offset error to the filter processing with the passage of time, the filter processing means 28D in the offset error operation means may remove the values that differ greatly from the previous value so will not to be subjected to the filter processing operation.

That is, when the deviation $\Delta \theta$ d in the detection value (offset error) sharply changes, i.e., when the deviation $\Delta \theta$ d between the detection value of this time and the detection value of the previous time becomes larger than the permissible value, the filter processing means 28D holds the offset error of the previous time and produces the offset error of the previous time as an offset error (correction value).

Therefore, even when an abnormal value is detected due to the superposition of a single-shot noise, the offset error is not erroneously operated and the control operation is not adversely affected.

Embodiment 7

In the embodiments 3 to 6, the rotational angle $\theta$ (steering angle) was not brought into consideration as a condition for operating the offset error. However, the offset error may be operated only in an angular range (i.e., near the neutral point) suited for operating the offset error.

In this case, the offset error operation means produces an offset error based on the deviation $\Delta \theta$ d in the detection value when the first angle detection value $\theta$ 1 lies within the second angular range D2 (±180 degrees) and produces an offset error of the previous time when the first angle detection value $\theta$ lies outside the second angular range D2.

By operating the offset error (correction value) only near the neutral point of the steering wheel 1 as described above, it is allowed to prevent the offset error from being erroneously operated and to prevent adverse effect on the control operation.

Embodiment 8

In the above-mentioned embodiments 1 to 7, the steering angle $\theta$ d only was used for the feedback control but the steering angular velocity $\omega$ was not taken into consideration. It is, however, also allowable to use the steering angular velocity $\omega$ for the feedback control operation in addition to using the steering angle $\theta$ d.

Described below with reference to the drawings is an embodiment 8 of the present invention in which the steering angular velocity $\omega$ is controlled by feedback.

Figure 10:
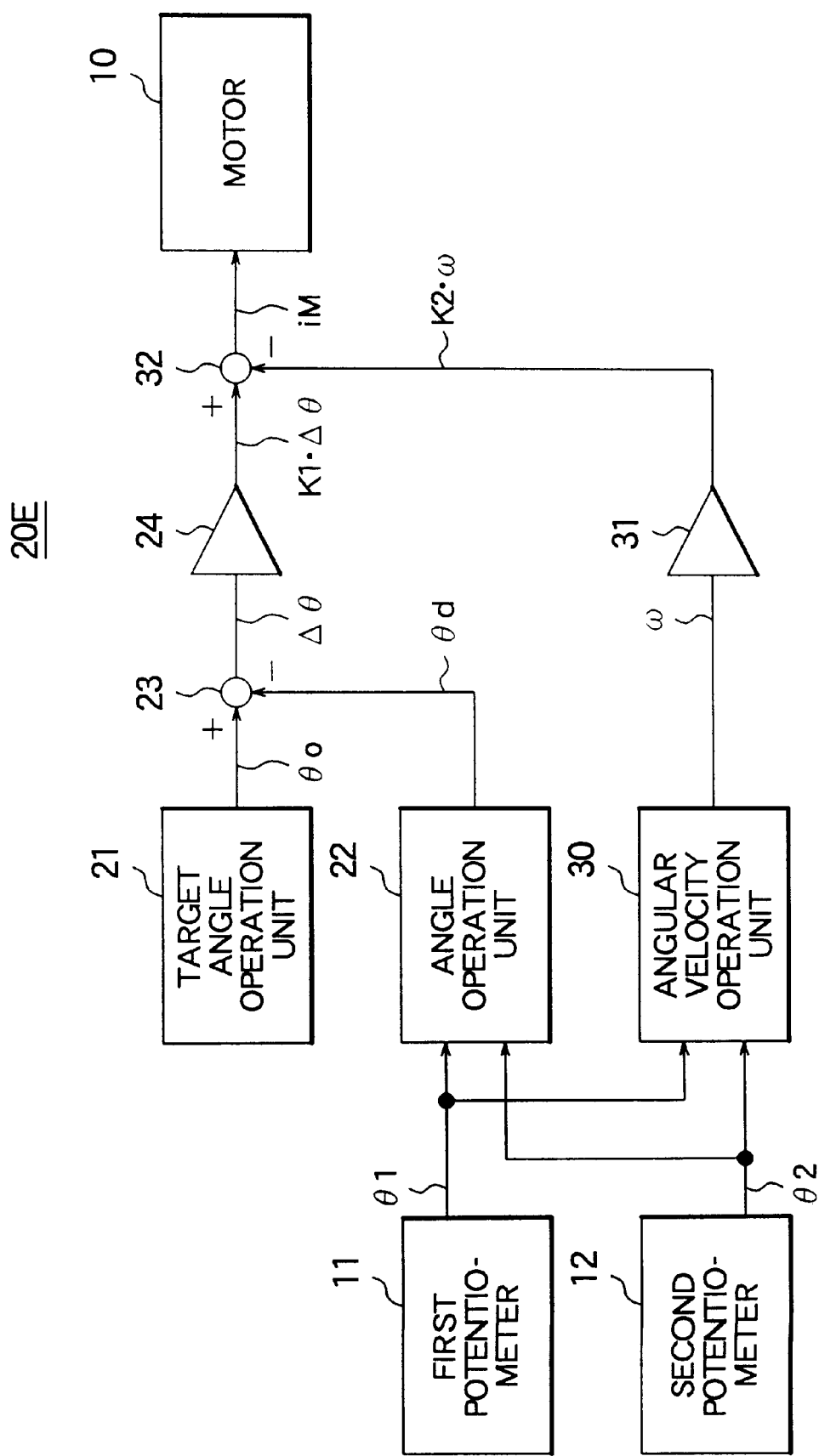
FIG. 10 is a functional block diagram illustrating a controller according to an embodiment 8 of the present invention.

FIG. 10 is a functional block diagram illustrating the controller 20E according to an embodiment 8 of the present invention, wherein the controller 20E includes an angular velocity operation unit 30, an output buffer 31 and a subtraction means 32 in addition to the above-mentioned constitution (see FIG. 2).

The angular velocity operation unit 30 constitutes a steering angular velocity operation means, and operates the rotational angular velocity of the steering shaft 2 as a steering angular velocity $\omega$ based on the first and second angle detection values $\theta$ 1, $\theta$ 2.

The angular velocity operation unit 30 operates the steering angular velocity $\omega$ based, for example, on the difference between the first angle detection value $\theta$ 1 and the first angle detection value after delayed.

The subtraction means 32 that constitutes the target torque operation means operates a motor current iM corresponding to the target torque based on a deviation (=K1·$\Delta \theta$–K2·$\omega$) between the target angular velocity (K1·$\Delta \theta$) of the steering shaft and the steering angular velocity (K2·$\omega$) through the output buffer 31.

In controlling the steering angle, in general, it has been known that a favorable control operation is accomplished when the steering angular velocity $\omega$ is added to the feedback control operation.

As shown in FIG. 10, therefore, the steering angular velocity $\omega$ is controlled by feed back to further stabilize the control operation.

Embodiment 9

In the above-mentioned embodiment 8, consideration was not given to the condition of the angle detection value used for the operation of the steering angular velocity $\omega$. It is, however, also allowable to operate the steering angular velocity $\omega$ from the angle detection value adapted to the operation of the steering angular velocity $\omega$.

In operating the steering angular velocity $\omega$, in general, it is desired to use an angle detection value maintaining a resolution as high as possible. By using a differential value of the second angle detection value $\theta$ 2, it is allowed to operate a steering angular velocity $\omega$ maintaining a high resolution.

That is, the angular velocity operation unit 30 operates the steering angular velocity $\omega$ based on the first angle detection value $\theta$ 1 when the first angle detection value $\theta$ 1 lies outside the second angular range D2.

When the first angle detection value $\theta$ 1 lies within the second angular range D2, on the other hand, the second angle detection value $\theta$ 2 becomes valid. Therefore, the angular velocity operation unit 30 operates the steering angular velocity $\omega$ based on the second angle detection value $\theta$ 2.

As described above, the steering angular velocity $\omega$ is operated maintaining a high resolution by using the second angle detection value $\theta$ 2 as far as possible.

Embodiment 10

In the above-mentioned embodiment 9, no consideration was given to a sharp change in the operated value of the steering angular velocity $\omega$ at the time when the angle detection values $\theta$ 1 and $\theta$ 2 were changed over. The steering angular velocity $\omega$, however, may be gradually changed by using a weighing/synthesizing means.

Described below with reference to the drawings is an embodiment 10 of the present invention which uses the weighing/synthesizing means for the steering angular velocity $\omega$.

Figure 11:
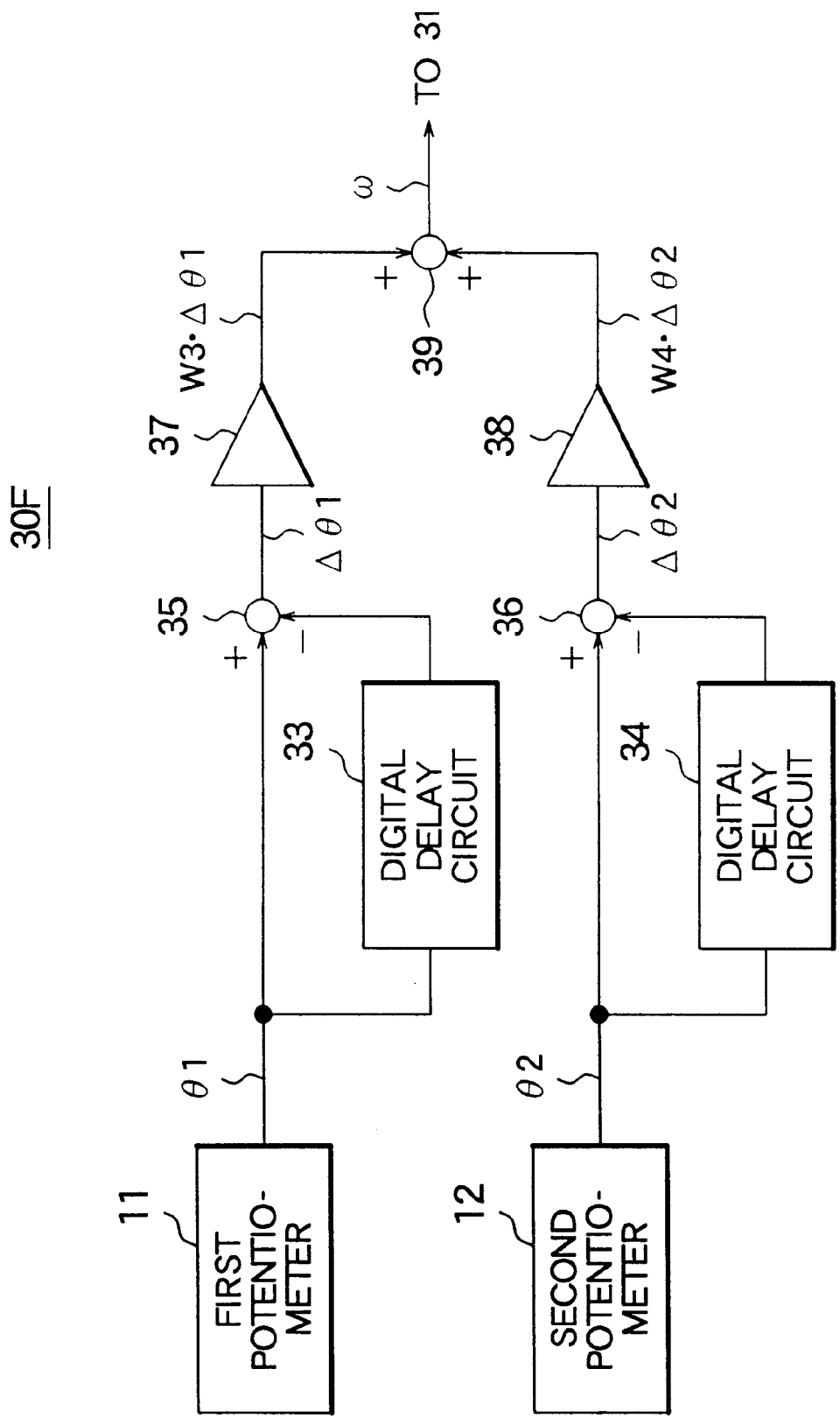
FIG. 11 is a block diagram concretely illustrating the constitution of the angle operation unit according to an embodiment 10 of the present invention.

FIG. 11 is a block diagram concretely illustrating the constitution of the angular velocity operation unit 30F according to the embodiment 10 of the present invention.

In FIG. 11, the angular velocity operation unit 30F includes digital delay circuits 33 and 34 for delaying the angle detection values $\theta$ 1 and $\theta$ 2, respectively, subtraction means 35 and 36 for operating differential values $\Delta \theta$ 1 and $\Delta \theta$ 2 of the angle detection values $\theta$ 1 and $\theta$ 2 of before and after the delay processing, multiplier means 37 and 38 for multiplying the differential values $\Delta \theta$ 1 and $\Delta \iota$ 2 by the weighing coefficients W3 and W4, and an adder means 39 for adding up the output values W3·$\Delta \theta$ 1 and W4·$\Delta \theta$ 2 of the multiplier means 37 and 38 together to output the resultant value as a steering angular velocity $\omega$.

The digital delay circuit 33 and the subtraction means 35 constitute a first steering angular velocity operation unit for operating a differential value Δ θ 1 (first steering angular velocity) from the first angle detection value θ 1.

The digital delay circuit 34 and the subtraction means 36 constitute a second steering angular velocity operation unit for operating a differential value Δ θ 2 (second steering angular velocity) from the second angle detection value θ 2).

The multiplier means 37, 38 and the adder means 39 constitute a weighing/synthesizing means for weighing and synthesizing the differential values Δ θ 1 and Δ θ 2 (first and second steering angular velocities), and for producing the output value of the adder means 39 as a steering angular velocity ω in the range Dn close to the angular position where the angle detection values θ 1 and θ 2 are changed over.

By providing the angular velocity operation unit 30F with the weighing/synthesizing means-as described above, the operated value of the steering angle ω changes mildly at the time when the angle detection values θ 1 and θ 2 are changed over, and the control operation is not adversely affected by the discrete portions.

Embodiment 11

In the above-mentioned embodiment 8, the second angle detection value θ 2 was used for operating the steering angular velocity ω in the second angular range D2 only. When there is used the second potentiometer 12 of the type that repetitively produces the output value as described earlier (see FIG. 4), however, the second angle detection value θ 2 may be used in the repetitive angular ranges (linearly changing ranges).

In this case, the angular velocity operation unit 30 operates the steering angular velocity based on the second angle detection value θ 2 in the angular ranges in which the second angle detection value θ 2 changes linearly.

As will be obvious from FIG. 4, however, the second angle detection value θ 2 sharply changes for every turn. In the range Dn near the angular position where the second angle detection value θ 2 sharply changes, therefore, the angular velocity operation unit 30 operates the steering angular velocity ω based on the first angle detection value θ 1.

That is, based on the first angle detection value θ 1, the angular velocity operation unit 30 judges whether the angle is lying in the range Dn close to the angular position where the second angle detection value θ 2 sharply changes. When it is judged that the angle is lying in the close range Dn, the first angle detection value θ 1 is used. When it is judged that the angle is not lying in the close range Dn, the second angle detection value θ 2 is used.

Thus, adverse effect on the control operation is avoided that results from a quick change in the second angle detection value θ 2.

In the unstable region, furthermore, the first angle detection value θ 1 is used to operate the steering angular velocity ω maintaining a high resolution over the whole rotational region of the steering wheel 1 without the need of adding any new part.

What is claimed is:

1. A device for controlling a steering angle of a vehicle comprising:

a steering drive means for rotatably driving a steering shaft;

a steering angle detection means for producing a rotational angle of said steering shaft as a detected angular value; and a target torque operation means for operating a target torque to be applied to said steering shaft based on a deviation between a target angle of said steering shaft and a steering angle based on said detected angular value, wherein said target torque is applied to said steering shaft through said steering drive means so that said steering angle is brought into agreement with said target angle;

wherein said steering angle detection means includes:

a first potentiometer that produces a first detected angular value proportional to a rotational position over a first angular range in which said steering shaft can be turned; and a second potentiometer that produces a second detected angular value proportional to a rotational position over a second angular range which includes a neutral point of said steering shaft and is narrower than said first angular range; and wherein said target torque operation means includes an angle operation unit for operating said steering angle based on said first and second detected angular values; and wherein said angle operation unit produces said first detected angular value as said steering angle when said first detected angular value lies outside said second angular range, and produces said second detected angular value as said steering angle when said first detected angular value lies within said second angular range.

2. A device for controlling a steering angle of a vehicle according to claim 1, wherein said angle operation unit includes a weighing/synthesizing means for weighing and synthesizing said first and second detected angular values and wherein, an output value of said weighing/synthesizing means is produced as said steering angle in a range close to an angular position where said first and second detected angular values are changed over, said weighing/synthesizing means uses a first weighing coefficient and a second weighing coefficient which gradually change in a complementary manner in said close range, and produces values obtained by multiplying said first and second detected angular values by said first and second weighing coefficients, said first weighing coefficient being set to 1 outside said second angular range and being set to 0 within said second angular range, and said second weighing coefficient being set to 0 outside said second angular range and being set to 1 within said second angular range.

3. A device for controlling a steering angle of a vehicle according to claim 1, wherein said angle operation unit includes:

an offset error operation means for operating an offset error between said first potentiometer and said second potentiometer based on a deviation between said first detected angular value and said second detected angular value; and a correction means for correcting at least either said first detected angular value or said second angle detection value by using said offset error.

4. A device for controlling a steering angle of a vehicle according to claim 3, wherein said offset error operation means includes a histogram operation means for operating a histogram of a deviation in the detected angular values, and produces, as an offset error, a deviation in the detected angular values that appears most frequently in said histogram.

5. A device for controlling a steering angle of a vehicle according to claim 3, wherein said offset error operation means includes a filtering means, and uses a first filtering coefficient and a second filtering coefficient that are set in a complementary manner, and produces, as said offset error, values obtained by multiplying a deviation in a detected value at a present time and a deviation in a detected value at a previous time by said first filtering coefficient and said second filtering coefficient, respectively.

6. A device for controlling a steering angle of a vehicle according to claim 5, wherein said offset error operation means produces the offset error of the previous time when a difference between the deviation in the detected value at the present time and the deviation in the detected value at the previous time is larger than a permissible value.

7. A device for controlling a steering angle of a vehicle according to the claim 3, wherein said offset error operation means produces said offset error based on a deviation in a detected value when said first detected angular value lies within said second angular range, and produces a deviation in the detected value at a previous time as said offset error when said first detected angular value lies outside said second angular range.

8. A device for controlling a steering angle of a vehicle according to claim 1, wherein said second potentiometer produces the second detected angular value in a manner to repeat a same value for every turn of said second potentiometer.

9. A device for controlling a steering angle of a vehicle according to claim 1, further comprising a steering angular velocity operation means for operating a rotational angular velocity of said steering shaft as a steering angular velocity based on said first and second detected angular values, and wherein said target torque operation means operates said target torque based upon a deviation between a target angular velocity of said steering shaft and said steering angular velocity.

10. A device for controlling a steering angle of a vehicle according to claim 9, wherein said steering angular velocity operation means operates said steering angular velocity based on said first detected angular value when said first detected angular value lies outside said second angular range, and operates said steering angular velocity based on said second detected angular value when said first detected angular value lies within said second angular range.

11. A device for controlling a steering angle of a vehicle according to claim 10, wherein said steering angular velocity operation means includes:

a first steering angular velocity operation unit and a second steering angular velocity operation unit for operating a first steering angular velocity and a second steering angular velocity, respectively, from said first and second detected angular values; and a weighing/synthesizing means for weighing and synthesizing said first and second steering angular velocities; and wherein an output value of said weighing/synthesizing means is operated as said steering angular velocity in a range close to an angular position where said first and second detected angular values are changed over.

12. A device for controlling a steering angle of a vehicle according to claim 9, wherein said second potentiometer produces said second detected angular value in a manner to repeat the same value for every turn of the second potentiometer, and wherein said steering angular velocity operation means operates said steering angular velocity based on said second detected angular value in an angular range in which said second detected angular value linearly changes, and operates said steering angular velocity based on said first detected angular value in a range close to an angle where said second detected angular value sharply changes.

* * * * *